US012100419B2

(12) United States Patent
Nagarathnam

(10) Patent No.: US 12,100,419 B2
(45) Date of Patent: Sep. 24, 2024

(54) METHOD AND SYSTEM FOR IMPROVING ESTIMATION OF SOUND SOURCE LOCALIZATION BY USING INDOOR POSITION DATA FROM WIRELESS SYSTEM

(71) Applicant: ARRIS Enterprises LLC, Suwanee, GA (US)

(72) Inventor: Yuvaraj Nagarathnam, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 302 days.

(21) Appl. No.: 17/464,848

(22) Filed: Sep. 2, 2021

(65) Prior Publication Data

US 2022/0130416 A1 Apr. 28, 2022

Related U.S. Application Data

(60) Provisional application No. 63/106,056, filed on Oct. 27, 2020.

(51) Int. Cl.
*G10L 25/78* (2013.01)
*G10L 15/22* (2006.01)
(Continued)

(52) U.S. Cl.
CPC .............. *G10L 25/78* (2013.01); *G10L 15/22* (2013.01); *H04R 1/406* (2013.01); *H04R 3/005* (2013.01);
(Continued)

(58) Field of Classification Search
CPC .................... H04R 1/406; H04R 3/005; G10L 2021/02166; G10L 15/20; G10L 15/22; G10L 25/84; G10L 2015/223
See application file for complete search history.

(56) References Cited

U.S. PATENT DOCUMENTS 6,970,796 B2 11/2005 Tashev
9,729,821 B1 8/2017 Fineberg et al.
(Continued)

FOREIGN PATENT DOCUMENTS

KR 10-0932117 B1 12/2009
KR 10-2020-0090553 A 7/2020

OTHER PUBLICATIONS

Notification of Transmittal of the International Search Report (Forms PCT/ISA/220 and PCT/ISA/210) and the Written Opinion of the International Searching Authority (Form PCT/ISA/237) issued Dec. 21, 2021, by the International Application Division Korean Intellectual Property Office in corresponding International Application No. PCT/US2021/048795. (10 pages).

*Primary Examiner* — Mark Villena
(74) *Attorney, Agent, or Firm* — Panitch Schwarze Belisario & Nadel LLC

(57) ABSTRACT

A method, an electronic device or customer-premise equipment, and a computer readable medium are disclosed for estimating a sound source. The method includes detecting, on an electronic device, voice data from a space; calculating, on the electronic device, an estimated voice source location from the detected voice data; detecting, on the electronic device, wireless location data from a positioning system within the space; calculating, on the electronic device, a probability of a user within one or more regions from the calculated estimated voice source location and the detected wireless location data, the one or more regions being regions of a plurality of regions within the space; and steering, from the electronic device, a microphone array for voice detection toward the one or more regions having the probability of the user within the one or more regions.

22 Claims, 8 Drawing Sheets

(51) Int. Cl.
  *H04R 1/40* (2006.01)
  *H04R 3/00* (2006.01)
  *H04W 4/029* (2018.01)

(52) U.S. Cl.
  CPC ....... *H04W 4/029* (2018.02); *G10L 2015/223* (2013.01); *G10L 2025/786* (2013.01)

(56) References Cited

U.S. PATENT DOCUMENTS

| | | | |
|---|---|---|---|
| 2008/0232607 A1* | 9/2008 | Tashev | H04B 7/0854 342/381 |
| 2015/0149164 A1* | 5/2015 | Oh | G10L 15/20 704/231 |
| 2017/0099556 A1* | 4/2017 | Cierna | G10L 25/84 |
| 2018/0041849 A1 | 2/2018 | Farmani et al. | |
| 2019/0349674 A1* | 11/2019 | Matsumoto | G01S 11/14 |
| 2019/0364359 A1* | 11/2019 | Ferguson | H04R 5/04 |
| 2020/0137487 A1 | 4/2020 | Abrams et al. | |
| 2020/0219493 A1* | 7/2020 | Li | H04R 3/005 |
| 2020/0234704 A1 | 7/2020 | Cho et al. | |
| 2020/0265860 A1* | 8/2020 | Mouncer | H04R 5/04 |
| 2020/0374624 A1* | 11/2020 | Koschak | H04R 3/12 |
| 2021/0120335 A1* | 4/2021 | Veselinovic | G10L 21/0216 |
| 2021/0134280 A1* | 5/2021 | Kurtz | G10L 15/30 |
| 2022/0270601 A1* | 8/2022 | Hines | G10L 15/32 |

\* cited by examiner

METHOD AND SYSTEM FOR IMPROVING ESTIMATION OF SOUND SOURCE LOCALIZATION BY USING INDOOR POSITION DATA FROM WIRELESS SYSTEM

TECHNICAL FIELD

The present disclosure generally relates generally to a method and system for improving estimation of sound source localization by using indoor position data from wireless system.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard. Subscribers connect their computers, routers, voice-over-IP telephones and other devices to this network through the network terminals, for example, cable modems (CM) or network gateways.

To provide television and data services, a MSO typically uses a Cable Modem Termination System ("CMTS") for the data services and a quadrature amplitude modulation ("QAM") multiplexer for downstream broadcast television, narrow cast and video-on-demand (VoD) traffic signals. These devices may be located at one or more hubs, which are typically connected to a head end via a network according to a networking protocol, such as Ethernet or SONET. A residential cable customer is typically connected to the CMTS and hub via a cable modem and a wireless router that may be combined in a single box which is called a gateway. In order to view, for example, video content that is transmitted through the cable modem or gateway, residential customers connect, for example, their televisions to a set-top box (STB).

The set-top box can be used by the subscriber to access a variety of multimedia services, including but not limited to live or linear television, digital video recorder (DVR) content, video-on-demand (VoD) content, over-the-top (OTT) content, and others. For example, set-top boxes usually play user selected content, for example, either live or with a digital video recorder (DVR). In addition, content can be accessed by remote controllers and/or via a voice or speech detection application system.

Smart media devices (SMD) intuitively combine in the connected home, for example, a set-top box, smart speaker, visual smart assistant, Internet of Things (IoT) hub and remote control into a single device. The smart media device is a framework that allows service providers to deliver compelling, personalized and aggregated services in entertainment, home control, e-health, education, utilities, productivity, and more. For example, the SMD can deliver content, for example, live television (TV), over-the-top (OTT) media server, and on-demand with a consistent experience, including voice-enabled search that works across all media sources.

Televisions are generally placed in the most used areas of the home, which can be ideal locations for voice assistants. For example, far-field microphones and speakers support familiar smart speaker services, such as Google Assistant or Amazon Alexa, with enhanced visual engagement through the TV. In addition, multiple wake-words allow for several voice assistants to be used, including a service provider's own voice services, which can including turning on the TV, change channels, or search for content by just asking. In addition, one of the primary uses of voice assistants is controlling and managing home IoT services such as lighting and heating, simplifying the management of the home network. For example, service providers can become aggregators of voice-visual services in the home, such as e-health, home security, education, and other home-oriented services.

In addition, speech activity detection system can use voice source location data to aid in receiving the command clearly and filtering out the environmental noise and unwanted sources of sound. Such technique of spatial filtering can be used for spatial steering of the received data, for example, at the post processing stage of processing the audio data, which can help the voice (command) detection process by avoiding data from undesired spatial segments containing noise and unwanted data.

In addition, data on the origination of the voice (voice source data) can be used to direct a microphone array to beamform the reception towards the direction of the voice source. The method of beamforming at the post processing stage helps in clearly receiving the user's command. For example, the same sound source localization technique can also be used for tracking the moving audio source. Various sound source localization technique such as using the energy level of the voice signal, TDOA (time difference of arrival), Direction of arrival estimates, Time of Arrival (TOA), Angle of Arrival (AOA), etc., are known.

Voice localization by an audio device is generally initiated only after a trigger command is sent. Known systems are configured to track the moving of the voice sources and utilizes the audio data from the direction of the present location of the source and from the regions around it to compensate for possible movement in different directions. The present systems, however, are not relatively accurate and uses audio data from regions where human activity is not present, thus adding noise to the system. In addition, additional data also need more processing of the audio data before the command is decoded.

It would be desirable to improve audio driven home automation, for example, by using wireless positioning to improve the detection of audio signals in the midst of environmental noise and which can improve the accuracy of audio source localization.

SUMMARY

In accordance with an exemplary embodiment, a system and method are disclosed for audio antenna array beamforming before the trigger command or trigger word is sent, which could, for example, help audio reception accuracy. For example, such a system and method could help in improving accuracy of sound source location data. Furthermore, such a system and method could help in saving energy being spent in processing data from areas where there is no human activity.

In accordance with an aspect, a method is disclosed for estimating a sound source, the method comprising: detecting, on an electronic device, voice data from a space; calculating, on the electronic device, an estimated voice source location from the detected voice data; detecting, on the electronic device, wireless location data from a positioning system within the space; calculating, on the electronic device, a probability of a user within one or more regions from the calculated estimated voice source location and the detected wireless location data, the one or more regions being regions of a plurality of regions within the space; and steering, from the electronic device, a microphone array for voice detection toward the one or more regions having the probability of the user within the one or more regions.

In accordance with an another aspect, a customer-premise equipment is disclosed, the customer-premise equipment comprising: a processor configured to: detect voice data from a space; calculate an estimated voice source location from the detected voice data; detect wireless location data from a positioning system within the space; calculate a probability of a user within one or more regions from the calculated estimated voice source location and the detected wireless location data, the one or more regions being regions of a plurality of regions within the space; and steer a microphone array for voice detection toward the one or more regions having the probability of the user within the one or more regions.

In accordance with a further aspect, a non-transitory computer readable medium is disclosed having instructions operable to cause one or more processors to perform operations comprising: detecting, on a customer-premise equipment, voice data from a space; calculating, on the customer-premise equipment, an estimated voice source location from the detected voice data; detecting, on the customer-premise equipment, wireless location data from a positioning system within the space; calculating, on the customer-premise equipment, a probability of a user within one or more regions from the calculated estimated voice source location and the detected wireless location data, the one or more regions being regions of a plurality of regions within the space; and steering, from the customer-premise equipment, a microphone array for voice detection toward the one or more regions having the probability of the user within the one or more regions.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

In accordance with an exemplary embodiment, a system and method are disclosed that uses a wireless positioning system using one or more of a combination of Received Signal Strength Indicator (RSSI), WiFi, CSI (Channel state Information), AOA (angle of arrival), antenna steering data, etc. for improving voice source localization and for detecting human activity before the trigger command is sent and with such a system and method, microphone array steering can be done before the trigger command.

In addition, using wireless location data in addition to voice-source localization data for a moving source can help in improving estimation of the moving audio source. For example, estimating the next possible region/direction the user will move based on a user's present location, direction, and speed of movement of the audio source using wireless position of wireless radar can help the sound source localization process by focusing its energy in the areas of possible audio sources and avoiding others, and thus improving processing efficiency and accuracy. In addition, using wireless location data in addition to voice-source location data can help in improving estimation of audio source. For example, data from both systems reinforce each other in better estimation of the voice source location.

Figure 1:
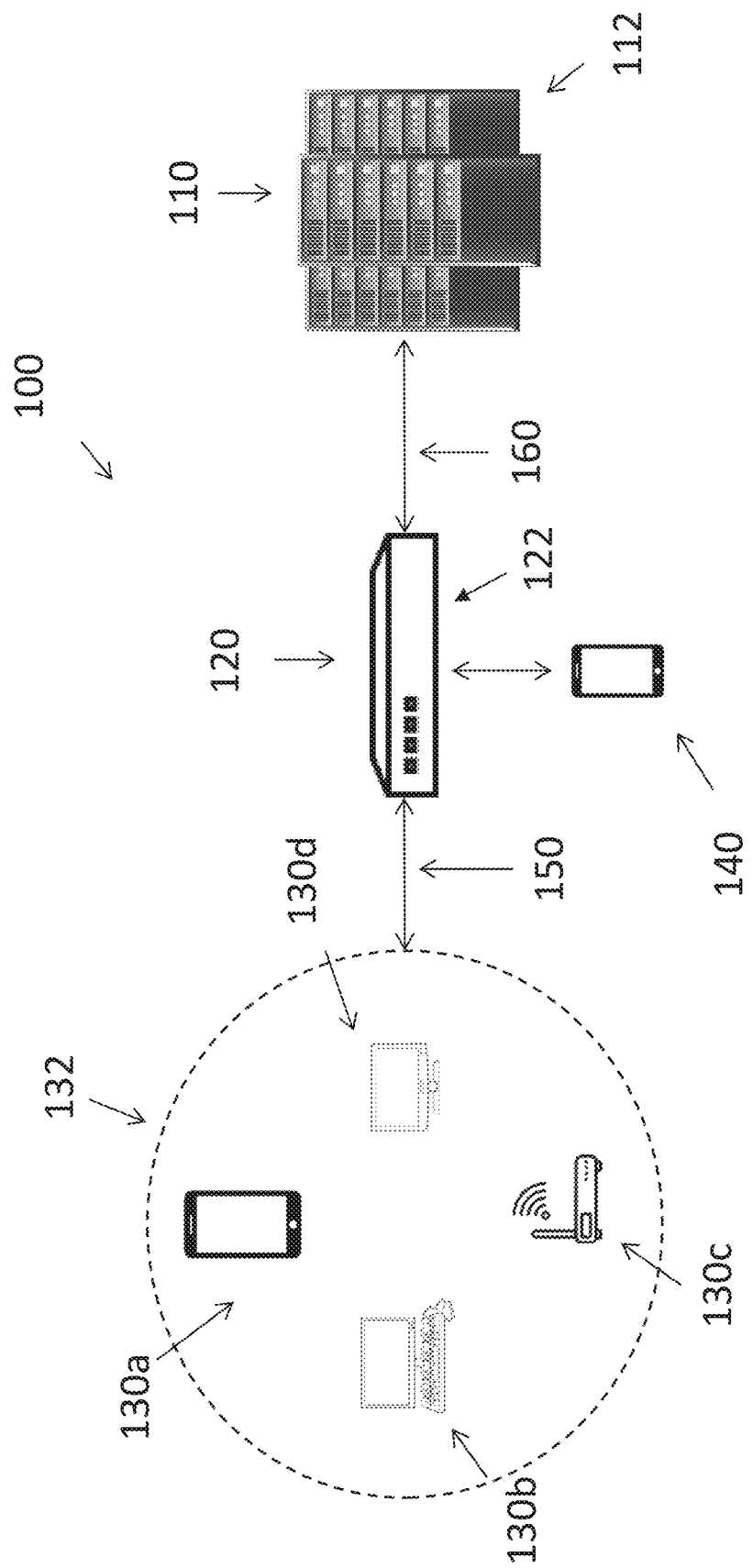
FIG. 1 is an illustration of an exemplary network environment for a system and method for improving estimation of sound source localization by using indoor position data from a wireless system.

System for Improving Estimation of Sound Source Localization by Using Indoor Position Data from a Wireless System FIG. 1 is a block diagram illustrating an example network environment 100 operable for improving estimation of sound source localization by using indoor position data from a wireless system 200 (FIG. 2) including a wireless indoor positioning system 140, for example, to assist an electronic device 120, which includes voice assistance. For example, the electronic device 120 can be a device that uses a voice command to trigger an activity.

In accordance with an exemplary embodiment, the electronic device 120 can be, for example, a customer-premise equipment or customer-provided equipment (CPE) 122 with voice recognition. In accordance with an embodiment, the customer-premise equipment or customer-provided equipment (CPE) 122 can be, for example, a smart media device (SMD). The customer-premise equipment or customer-provided equipment (CPE) 122 can provide, for example, video and/or data services to a plurality of devices or clients 130*a*, 130*b*, 130*c*, 130*d*. The CPE 122 may communicate with the plurality of devices 130*a*, 130*b*, 130*c*, 130*d* over a local network 132 (for example, a local area network (LAN), a wireless local area network (WLAN), a personal area network (PAN), etc.) and/or wired, connected to a modem, and may communicate with an upstream wide area network (WAN) 160 through a connection 150 to one or more servers 110, for example, of a cable service provider 112. The one or more servers 110 can provide high-bandwidth data transfer, for example, cable television and broadband Internet access via, for example, coaxial cables 150. The one or more servers 110 of the cable service provider 112 can be configured to deliver services, for example, cable television and/or broadband Internet and infrastructure supporting such services including management of image software and/or firmware.

In accordance with an exemplary embodiment, the CPE 122 and the plurality of devices 130a, 130b, 130c, 130d can be configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the CPE 122. The CPE 122 may provide access to an external network, such as the Internet, for any devices connected thereto via the area network 132. The area network 132 may be, for instance a local area. In accordance with an exemplary embodiment, the CPE 122 may be a smart media device, a gateway device, an access point, a modem, a wireless router including an embedded modem, a wireless network extender or any other device operable to deliver, for example, data and/or video services from the one or more servers 110 of the cable service provider 112 and/or a wide area network (WAN) 160 to one or more of the plurality of devices 130a, 130b, 130c, 130d.

In accordance with an exemplary embodiment, the CPE 122 may communicate with the one or more servers 110 over a wired or a wireless connection. A wireless connection between the one or more servers 110 of the cable service provider 112 and the CPE 122 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Figure 2:
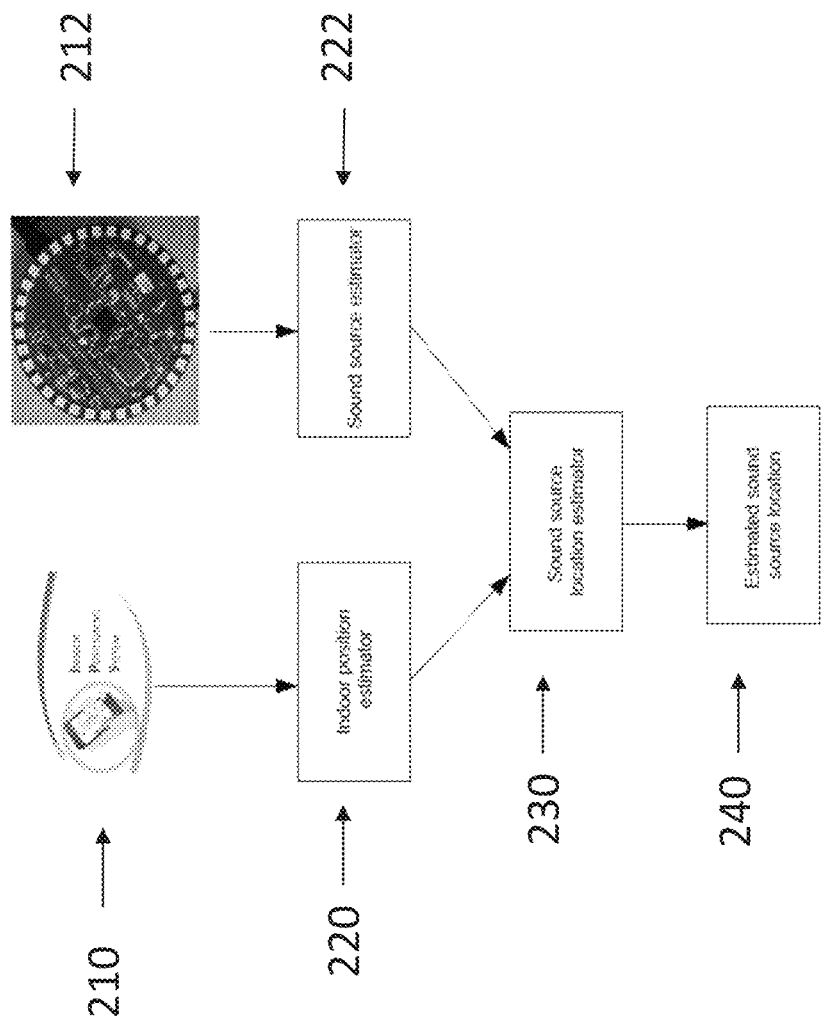
FIG. 2 is an illustration of a system to estimate a sound source from a wireless position estimator and a sound source estimator in accordance with an exemplary embodiment.

FIG. 2 is an illustration of a system 200 to estimate a sound source from a wireless position estimator 140 in accordance with an exemplary embodiment. As shown in FIG. 2, the system 200 includes an indoor position estimator 220 configured to estimates a location of an indoor positioning system 210 and a sound source estimator 222 configured to estimate a location, for example, of a user and/or device 212. In accordance with an exemplary embodiment, the indoor position estimator 220 can be configured to estimate the position or location of the indoor positioning system 210 using, for example, one or more passive or active wireless radar positioning systems including Received Signal Strength Indicator (RSSI), WiFi, CSI (Channel state Information), AOA (angle of arrival), antenna steering data, etc. In accordance with an exemplary embodiment, the indoor positing system 210 can use, for example, a smart phone (active) 140, or wireless radar (passive).

In accordance with an exemplary embodiment, the sound source estimator 222 can be any suitable device that can estimate a location of a sound, for example, voice data or voice source location data, within a space. In accordance with an exemplary embodiment, the indoor position estimator 220 and the sound source estimator 222 can be separate devices, or alternatively, the indoor position estimator 220 and the sound source estimator 222 can be located within a single device, for example, an electronic device 120, which includes voice assistance, or a customer-premise equipment 122, for example, a smart media device. As shown in FIG. 2, data from the indoor position estimator 220 and the sound source estimator 222 can be combined (230) and an estimate of the sound source location (240) can be provided as further disclosed herein.

Process for Sound Source Estimation

Figure 3:
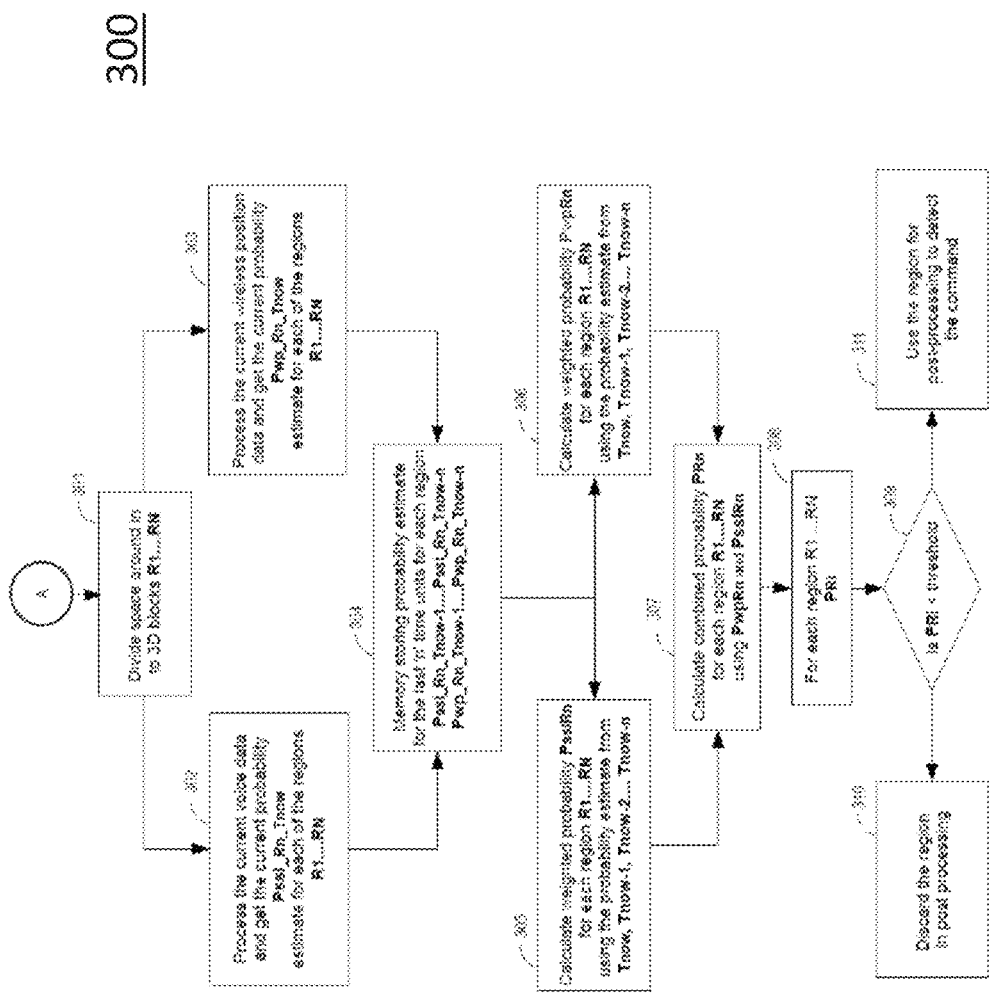
FIG. 3 is a flow chart of the process of sound source estimation using an exemplary embodiment.
Figure 4:
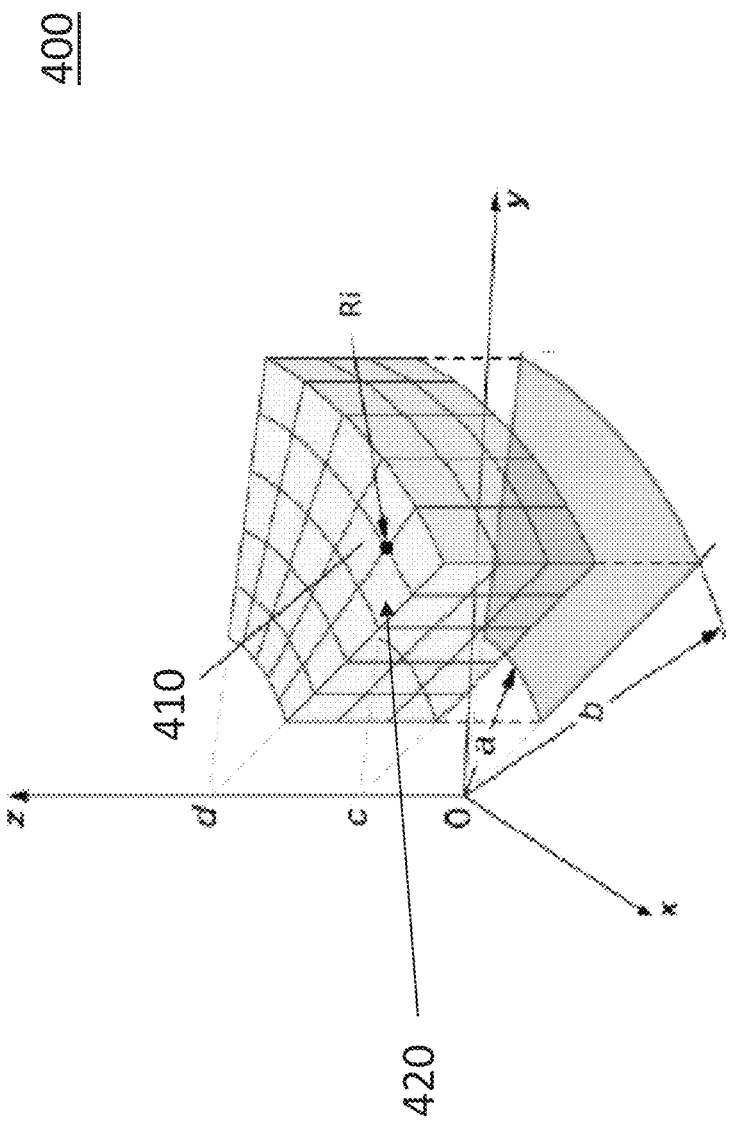
FIG. 4 is an illustration of estimation data from the estimators representing a point in three-dimensional (3D) space in accordance with an exemplary embodiment.

FIG. 3 is a flow chart 300 of the process of sound source estimation using an exemplary embodiment. As shown in FIG. 3, the process starts at A, and in step 301, in which the space of sound source estimation is divided into a plurality of three-dimension (3D) blocks 410 (for example regions) R1 . . . RN, as shown, for example, in FIG. 4. In accordance with an exemplary embodiment, each region 410 may overlap with another region 420. In step 302, the process uses the voice data that is currently available from the antenna array's (for example, as shown in FIG. 2) and starts processing the voice data for sound source localization. In accordance with an exemplary embodiment, when estimating the sound source, the process uses the 3D regions divided in step 301 and for each region 410, 420, the process can provide a probability of the availability of a voice source. In accordance with an exemplary embodiment, the probability estimates can be represented as $Pssl\_R1\_Tnow \ldots Pssl\_RN\_Tnow$, which correspond to regions R1 . . . RN. In step 303, the process uses the wireless position data from the wireless system which may be available from the same device 140, 142 as the sound source estimator 142, or a separate device 140. In accordance with an exemplary embodiment, the process uses the 3D regions divided at 301 and for each region 410 provides a probability of the availability of a human activity. These probability estimates of human activity can be represented as $Pwp\_R1\_Tnow \ldots Pwp\_RN\_Tnow$, which correspond to regions R1 . . . RN.

In accordance with an exemplary embodiment, at step 304, the probability estimates from 302 and 303 are stored into a memory, and wherein probability estimate stored in the memory are for the last 'n' time units.

In accordance with an exemplary embodiment, using the past probability values and the current probability values for each region available from step 304, at step 305, a weighted probability estimates of the sound source for each region using the current probability estimate and the probability estimates from the last 'n' time units can be calculated. In this process the weights Wnow, Wnow−1 . . . Wnow−n are chosen such that the probability estimate of the current time unit is given higher weightage compared to the weight for the data from the previous time units. In accordance with an exemplary embodiment, the weight can be logarithmic 500 or linear 600 as shown, for example, in FIGS. 5 and 6, respectively. In one of the embodiments, the consolidated estimates of the sound source for each region 'i', for the past 'n' time units is calculated using:

$$Pssl\_Ri = \Sigma Wj \times Pssl\_R1\_Tj, \text{ where 'j' is from 'now' to 'now-n'}.$$

Figure 5:
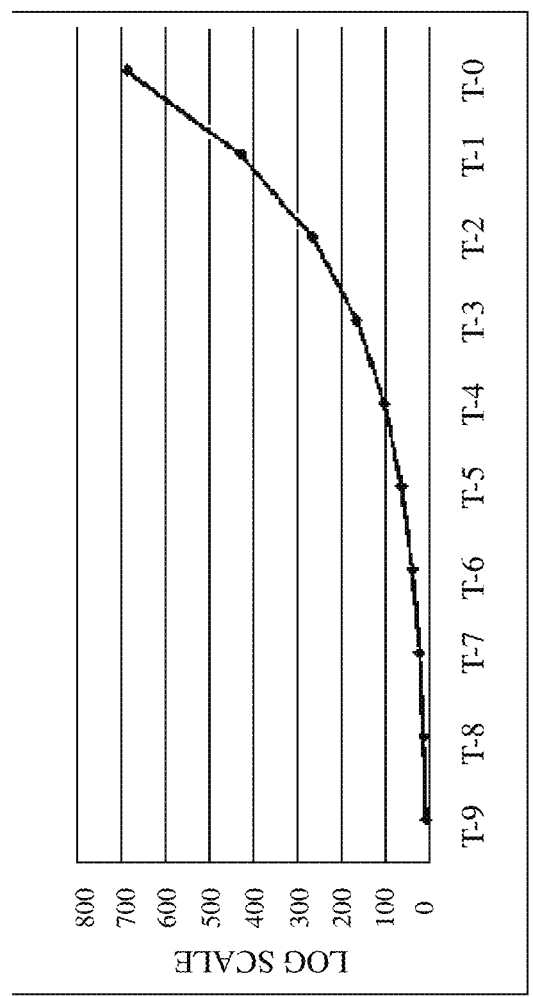
FIG. 5 is an illustration of a graph illustrating a weighted probability estimate on a logarithmic bases in accordance with an exemplary embodiment.
Figure 6:
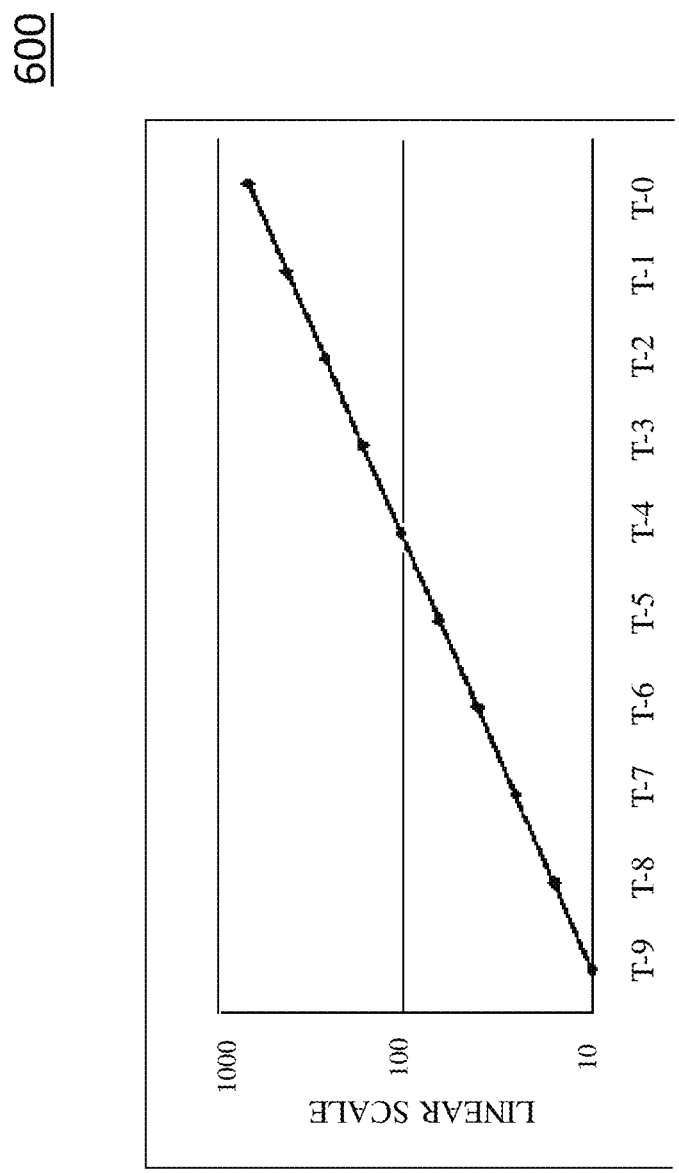
FIG. 6 is an illustration of a graph illustrating a weight probability estimate on a linear bases in accordance with an exemplary embodiment.

In accordance with an exemplary embodiment, using the past probability values and the current probability values for each region that's available from step 304, at step 306, the weighted probability estimates of the wireless position for each region using the current probability estimate and the probability estimates from the last 'n' time units are calculated. In this process the weights Wnow, Wnow−1 . . . Wnow−n are chosen such that the probability estimate of the current time unit is given higher weightage compared to the data from the previous time units. In accordance with an aspect, the weight can be linear or logarithmic as shown in FIGS. 5 and 6. In one of the embodiments, the consolidated estimates of the sound source for each region 'i', for the past 'n' time units is calculated using:

$$Pwp\_Ri = \Sigma Wj \Sigma Pwp\_R1\_Tj, \text{ where 'j' is from 'now' to 'now-n'}.$$

In accordance with an exemplary embodiment, at step 307, the probability of the availability of the sound source for each region Pssl_Ri and probability of availability of the human activity using wireless position Pwp_Ri are used to derive the combined probability estimate PRi, which correspond to region Ri. In accordance with an aspect, the combined probability estimate PRi can be, for example, a summation (Σ) operation or a complex mathematical formula.

In another embodiment, the probability estimates from steps 304 can be used in step 307, instead of the calculated weighted probabilities from steps 305 and 306. At step 307, the data from step 304 with estimates of the sound source for the past 'n' time units and the estimates of the wireless position for the past 'n' time units are used to get the final probability PRi of the sound source location.

In accordance with an exemplary embodiment, at step 308, the final probability PRi is processed and at 309, a decision is made for each region Ri, by comparing the final probability PRi with a threshold value. The threshold value may be arrived, for example, either empirically, using training data, and/or using machine learning algorithm using data from other users. In accordance with an exemplary embodiment, if at step 309, a decision is made that PRi is greater than or equal to (>) the threshold value, then the voice source location data from the region Ri is used for post-processing for estimating a voice command. If at 309 a decision is made that PRi is less than (<) the threshold value, then the voice source location data from the region Ri is discarded and not used for voice-command detection.

In accordance with an exemplary embodiment, by using the method disclosed above, only regions with possible sound sources are used in audio processing at the post processing stage and in the voice-command processing device, for example, the customer-premise equipment 122, such that voice detection accuracy of the voice-command processing device can be improved.

In accordance with an exemplary embodiment, the system and method can help in improving voice source detection process as the final combined probability estimate PRi, when a voice source is available in the region Ri will be higher. Instead of just relying on the sound source localization estimate, the combination of wireless positioning data, can help to reinforce the confidence on the availability of the voice command from the region, which can be reflected in the higher combined probability values PRi, from regions where both sound source localization and wireless position systems detects activity.

In addition, the system and method as disclosed can reduce the burden on the post processing stage. For example, with the disclosed system and method, when there are 2 possible sources of voice or sound with 1 having human presence, the region with human presence detected by wireless positioning system can be used and given higher priority compared to the region with just a source of sound which may originate from a Television or other electronic device or other possible sources of sound. In another example, with the disclosed system and method, even though when the trigger word has not been sent, since the regions with human activity will have more probability value, these detected regions can be used for post-processing, which can improve accuracy and also providing a method to steer the microphone array even before the trigger word is sent.

In accordance with an exemplary embodiment, in case of a moving voice source, the regions falling in the direction of the movement based on the past data are used in the processing of data at steps 305, 306, and 307. In one of the embodiments the wireless position data is used to estimate the next possible region the user will fall in to, based on the past data from step 306. It may use the speed of movement of the source and the direction of movement to include regions falling in the direction of the user for sound source localization.

In accordance with an exemplary embodiment, the system and method can track users when a trigger word has not yet been provided, and can help in better processing of the voice data for decoding the voice command. In addition, the process can also help in avoiding processing of voice data from regions where users are not available and thus reducing the processing burden.

In accordance with an exemplary embodiment, microphone array-steering to help trigger word detection accuracy, as the voice data from the direction of the user can used to detect the trigger word. In addition, the system and method can help in audio frame post-processing by adding additional inputs to estimate the direction of the voice source.

In accordance with an exemplary embodiment, the wireless indoor positioning data can be used for improving voice source localization, tracking a user before a trigger word is sent by the user, and/or for tracking a user while providing audio input. In addition, the system and method can provide a method of saving power of voice-controlled devices when there is no human activity in the vicinity.

Method for Improving Estimation of Sound Source Localization

Figure 7:
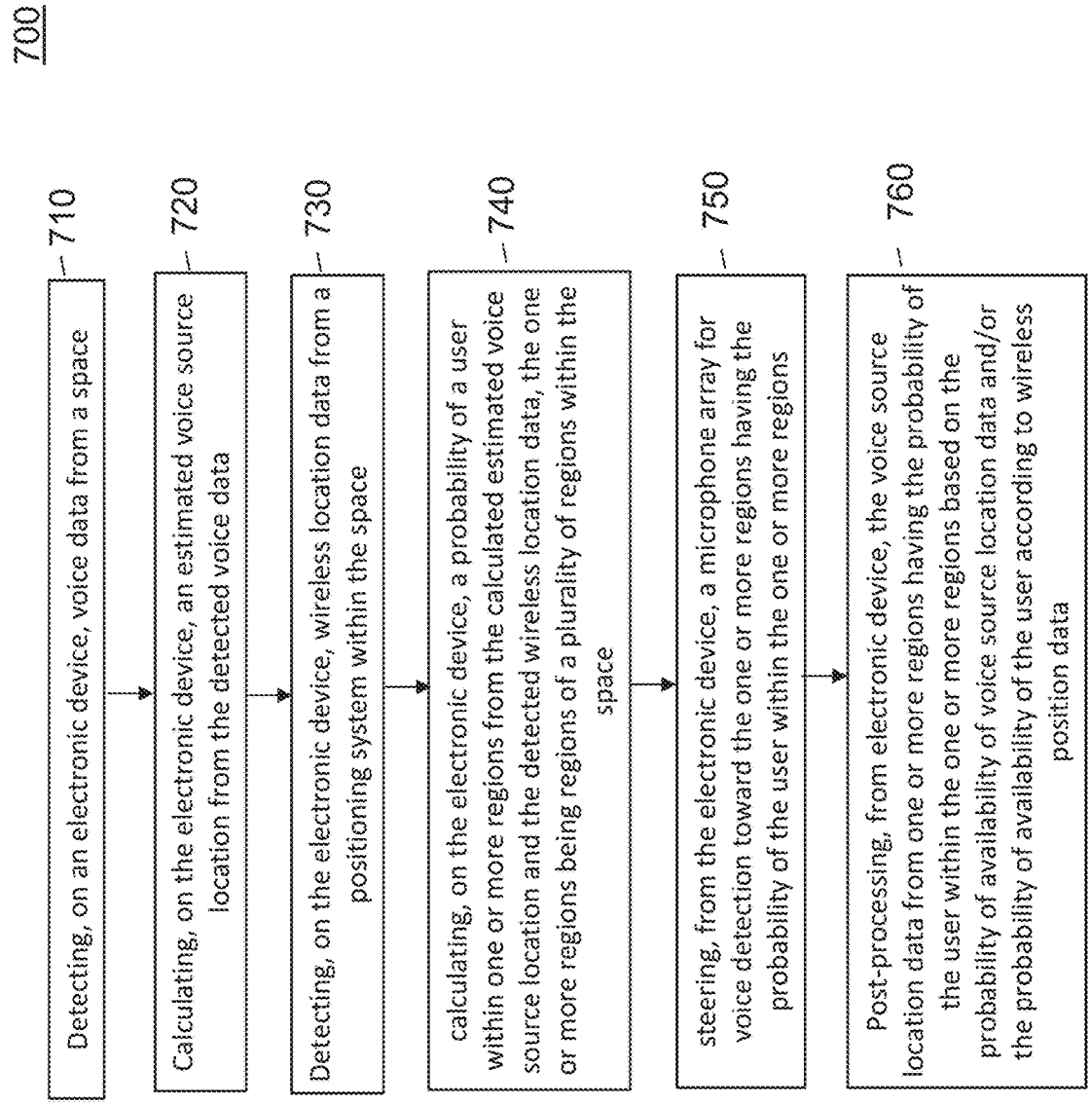
FIG. 7 is a flowchart illustrating a method for improving an estimation of sound source localization using indoor position data from a wireless system in accordance with an exemplary embodiment.

FIG. 7 is a flowchart illustrating a method 700 for improving an estimation of sound source localization using indoor position data from a wireless system in accordance with an exemplary embodiment. As shown in FIG. 7, in step 710, on an electronic device, voice data is detected from a space. In step 720, an estimated voice source location is calculated on the electronic device from the detected voice data. In step 730, wireless location data from a positioning system within the space is detected on the electronic device. In step 740, a probability of a user within one or more regions is calculated on the electronic device from the calculated estimated voice source location and the detected wireless location data, the one or more regions being regions of a plurality of regions within the space. In step 750, a microphone array for voice detection is steered from the electronic device toward the one or more regions having the probability of the user within the one or more regions. In step 760, the voice source location data from one or more regions having the probability of the user within the one or more regions can be post-processed on the electronic device based on the probability of availability of voice source location data and/or the probability of availability of the user according to wireless position data. Thus, by use of the probability of availability of the user according to the wireless position data can be used to make a better estimation of the voice source location by reducing the post-processing of voice source location data when the probability of the user in one or more regions is relatively low, for example, below the set threshold value. In addition, by having a relatively high probability that the user is in one or more of the regions, for example, data can be post-processed only where the user activity is detected based on the voice source location data and the wireless position data.

In accordance with an exemplary embodiment, current voice source location data from the detected voice data can be processed on the customer-premise equipment and a current probability estimate for each of the plurality of regions within the space from the current voice source location data from the detected voice data is calculated. In addition, current wireless position data from the detected wireless location data is processed on the electronic device and a current probability estimate for each of the plurality of regions within the space from the current wireless position data from the detected wireless location data is calculated. The current probability estimates for each of the plurality of regions from the current voice source location data and the current wireless position data is then stored on the customer-premise equipment.

In accordance with a weighted probability for each of the plurality of regions from the current voice source location data and a weighted probability for each of the plurality of regions from the current wireless position data can be calculated on the customer-premise equipment. In addition, a combined weighted probability for each of the plurality of regions using the calculated weighted probability form each of the regions from the current voice source location data and the calculated weighted probability for each of the regions from the current wireless position data can also be calculated on the customer-premise equipment.

In accordance with an exemplary embodiment, one or more of the plurality of regions having the combined weighted probability below a given threshold value for post processing can be discarded by the customer-premise equipment. In addition, any of the plurality of regions having the combined weighted probability equal to or greater than the threshold value for calculating a final probability of the user being within the one or more regions of the plurality of regions within the space can be used by the customer-premised equipment for detecting of a trigger command.

In accordance with exemplary embodiment, the plurality of regions are three-dimensional regions, and a linear weighted average for calculating the combined weighted probability for each of the plurality of regions using the calculated weighted probability form each of the regions from the current voice source location data and past voice source location data and the calculated weighted probability for each of the regions from the current wireless position data and past wireless position data can be used. In addition, the calculated weighted probability for each of the plurality of regions can be chosen such that a probability estimate for a current time unit is given a higher weightage compared to a weight for data from a previous time unit.

In accordance with an exemplary embodiment, the plurality of regions are three-dimensional regions, and a logarithmic weighted average for calculating the combined weighted probability for each of the plurality of regions using the calculated weighted probability form each of the regions from the current voice source location data and past voice source location data and the calculated weighted probability for each of the regions from the current wireless position data and past wireless position data can be used. In addition, the calculated weighted probability for each of the plurality of regions can be chosen such that a probability estimate for a current time unit is given a higher weightage compared to a weight for data from a previous time unit.

In accordance with an exemplary embodiment, the electronic device can be a customer-premise equipment (CPE) or a smart media device (SMD), which includes a voice remote control and one or more of a set-top box, a smart speaker, a visual smart assistant, and an IoT hub. In accordance with an exemplary embodiment, the voice remote control on the customer-premise equipment (CPE) or the smart media device (SMD) can be activated upon receiving a trigger command. In addition, the positioning system can be a smart phone, and a wireless signal from the smart phone can be detected on the electronic device, for example, the customer-premise equipment (CPE) or the smart media device (SMD) using one or more passive wireless radar position systems. The one or more passive wireless radar position systems including, for example, Received Signal Strength Indicator (RSSI), WiFi, CSI (Channel state Information), AOA (angle of arrival), and antenna steering data.

In accordance with an exemplary embodiment, the positioning system is a wireless radar system, and the method further includes detecting, on the electronic device, a wireless signal from the wireless radar system using one or more passive wireless radar position systems, the one or more passive wireless radar position systems including Received Signal Strength Indicator (RSSI), WiFi, CSI (Channel state Information), AOA (angle of arrival), and antenna steering data.

Computer System Architecture

Figure 8:
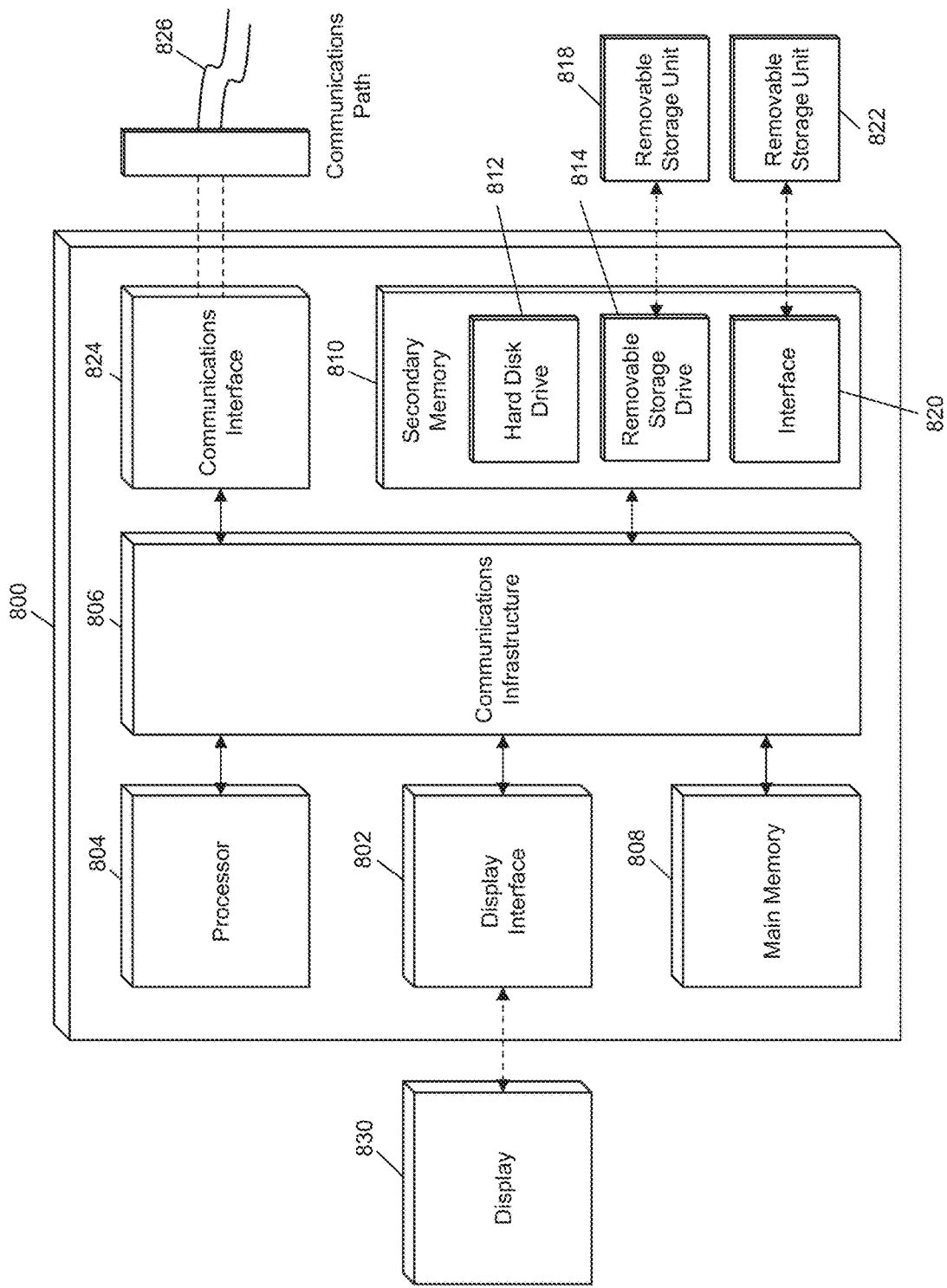
FIG. 8 is an exemplary hardware architecture for an embodiment of a communication device.

FIG. 8 illustrates a representative computer system 800 in which embodiments of the present disclosure, or portions thereof, may be implemented as computer-readable code executed on a processor of a computer. For example, the one or more servers 110, the electronic device 120, which includes voice assistance, the CPE 122, plurality of devices 130a, 130b, 130c, 130d, and one or more estimators 140, 142, of FIG. 1 may be implemented in whole or in part by a computer system 800 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this representative computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 1-7, as discussed herein. Accordingly, such computer programs may represent controllers of the computer system 800. Where the present disclosure is implemented using software executed on hardware, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software executed on hardware, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for parental control of broadband devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for estimating a sound source, the method comprising:
   detecting, on an electronic device, voice data from a space;
   calculating, on the electronic device, an estimated voice source location from the detected voice data;
   detecting, on the electronic device, wireless location data from a positioning system within the space, the positioning system being a separate device from the electronic device;
   calculating, on the electronic device, a probability of a user within one or more regions from the calculated estimated voice source location and the detected wireless location data, the one or more regions being regions of a plurality of regions within the space;
   steering, from the electronic device, a microphone array for voice detection toward the one or more regions having the probability of the user within the one or more regions; and
   receiving, on the electronic device, a voice command from the user located in the one or more regions having the probability of the user within the one or more regions, the voice command being an activity trigger for the electronic device.

2. The method according to claim 1, further comprising:
   processing, on the electronic device, current voice source location data from the detected voice data;
   calculating, on the electronic device, a current probability estimate for each of the plurality of regions within the space from the current voice source location data from the detected voice data;
   processing, on the electronic device, current wireless position data from the detected wireless location data;
   calculating, on the electronic device, a current probability estimate for each of the plurality of regions within the space from the current wireless position data from the detected wireless location data; and
   storing, on the electronic device, the current probability estimates for each of the plurality of regions from the current voice source location data and the current wireless position data.

3. The method according to claim 2, further comprising:
   calculating, on the electronic device, a weighted probability for each of the plurality of regions from the current voice source location data;
   calculating, on the electronic device, a weighted probability for each of the plurality of regions from the current wireless position data; and
   calculating, on the electronic device, a combined weighted probability for each of the plurality of regions using the calculated weighted probability form each of the regions from the current voice source location data and the calculated weighted probability for each of the regions from the current wireless position data.

4. The method according to claim 3, further comprising:
   discarding, on the electronic device, one or more of the plurality of regions having the combined weighted probability below a given threshold value for post processing; and/or
   using, on the electronic device, any of the plurality of regions having the combined weighted probability equal to or greater than the threshold value for calculating a final probability of the user being within the one or more regions of the plurality of regions within the space for detecting of a trigger command.

5. The method according to claim 3, wherein the plurality of regions are three-dimensional regions, the method further comprising:
   using a linear weighted average for calculating the combined weighted probability for each of the plurality of regions using the calculated weighted probability form each of the regions from the current voice source location data and past voice source location data and the calculated weighted probability for each of the regions from the current wireless position data and past wireless position data; and
   choosing the calculated weighted probability for each of the plurality of regions such that a probability estimate for a current time unit is given a higher weightage compared to a weight for data from a previous time unit.

6. The method according to claim 3, wherein the plurality of regions are three-dimensional regions, the method further comprising:
   using, a logarithmic weighted average for calculating the combined weighted probability for each of the plurality of regions using the calculated weighted probability form each of the regions from the current voice source location data and past voice source location data and the calculated weighted probability for each of the regions from the current wireless position data and past wireless position data; and
   choosing the calculated weighted probability for each of the plurality of regions such that a probability estimate for a current time unit is given a higher weightage compared to a weight for data from a previous time unit.

7. The method according to claim 2, further comprising:
   detecting, on the electronic device, movement of the voice source;
   wherein the calculating the probability of a user within one or more regions from the calculated estimated voice source location and the detected wireless location data includes:
      determining, on the electronic device, a region of the plurality of regions the voice source will move into based on the detected movement of the voice source and the stored probability estimates for each of the plurality of regions.

8. The method according to claim 1, wherein the electronic device is a customer-premise equipment (CPE), the customer-premise equipment includes a voice remote control and one or more of a set-top box, a smart speaker, a visual smart assistant, and an IoT hub, the method further comprising:
   activating, on the customer-premise equipment, the voice remote control upon receiving a trigger command.

9. The method according to claim 1, wherein the positioning system is a smart phone, the method further comprising:
   detecting, on the electronic device, a wireless signal from the smart phone using one or more active or passive wireless indoor position systems, the one or more active or passive wireless radar position systems including Received Signal Strength Indicator (RSSI), WiFi, CSI (Channel state Information), AOA (angle of arrival), and antenna steering data.

10. The method according to claim 1, wherein the positioning system is a wireless radar system, the method further comprising:
   detecting, on the electronic device, a wireless signal from the wireless radar system using one or more passive wireless radar position systems, the one or more passive wireless radar position systems including Received Signal Strength Indicator (RSSI), WiFi, CSI (Channel state Information), AOA (angle of arrival), and antenna steering data.

11. The method according to claim 1, further comprising:
   prior to detecting the voice data from the space, dividing, by the electronic device, the space into the plurality of regions, wherein the plurality of regions are three-dimensional blocks within the space.

12. A customer-premise equipment, the customer-premise equipment comprising:
   a processor configured to:
      detect voice data from a space;
      calculate an estimated voice source location from the detected voice data;
      detect wireless location data from a positioning system within the space, the positioning system being a separate device from the customer-premise equipment;
      calculate a probability of a user within one or more regions from the calculated estimated voice source location and the detected wireless location data, the one or more regions being regions of a plurality of regions within the space;
      steer a microphone array for voice detection toward the one or more regions having the probability of the user within the one or more regions; and
      receive a voice command from the user located in the one or more regions having the probability of the user within the one or more regions, the voice command being an activity trigger for the electronic device.

13. The customer-premise equipment according to claim 12, wherein the processor is further configured to:
   process current voice source location data from the detected voice data;
   calculate a current probability estimate for each of the plurality of regions within the space from the current voice source location data from the detected voice data;
   process current wireless position data from the detected wireless location data;
   calculate a current probability estimate for each of the plurality of regions within the space from the current wireless position data from the detected wireless location data; and
   store the current probability estimates for each of the plurality of regions from the current voice source location data and the current wireless position data.

14. The customer-premise equipment according to claim 13, wherein the processor is further configured to:
   calculate a weighted probability for each of the plurality of regions from the current voice source location data; and
   calculate a weighted probability for each of the plurality of regions from the current wireless position data; and
   calculate a combined weighted probability for each of the plurality of regions using the calculated weighted probability form each of the regions from the current voice source location data and the calculated weighted probability for each of the regions from the current wireless position data.

15. The customer-premise equipment according to claim 14, wherein the processor is further configured to:
   discard one or more of the plurality of regions having the combined weighted probability below a given threshold value for post processing; and/or
   use any of the plurality of regions having the combined weighted probability equal to or greater than the threshold value for calculating a final probability of the user being within the one or more regions of the plurality of regions within the space for detecting of a trigger command.

16. The customer-premise equipment according to claim 15, wherein the plurality of regions are three-dimensional regions and the processor is further configured to:
   use a linear weighted average for calculating the combined weighted probability for each of the plurality of regions using the calculated weighted probability form each of the regions from the current voice source location data and past voice source location data and the calculated weighted probability for each of the regions from the current wireless position data and past wireless position data; and
   choose the calculated weighted probability for each of the plurality of regions such that a probability estimate for a current time unit is given a higher weightage compared to a weight for data from a previous time unit.

17. The customer-premise equipment according to claim 15, wherein the plurality of regions are three-dimensional regions and the processor is further configured to:
   use a logarithmic weighted average for calculating the combined weighted probability for each of the plurality of regions using the calculated weighted probability form each of the regions from the current voice source location data and past voice source location data and the calculated weighted probability for each of the regions from the current wireless position data and past wireless position data; and
   choose the calculated weighted probability for each of the plurality of regions such that a probability estimate for a current time unit is given a higher weightage compared to a weight for data from a previous time unit.

18. The customer-premise equipment according to claim 15, wherein the positioning system is a smart phone or a wireless radar system, the processor is further configured to:
   detect a wireless signal from the smart phone using one or more active techniques and or detect human position using wireless radar position systems using passive techniques, the one or more passive wireless radar position systems including Received Signal Strength Indicator (RSSI), WiFi, CSI (Channel state Information), AOA (angle of arrival), and antenna steering data.

19. The customer-premise equipment according to claim 12, wherein the customer-premise equipment is a smart media device (SMD), the smart media device includes a voice remote control and one or more of a set-top box, a smart speaker, a visual smart assistant, and an IoT hub, and the processor is configured to:
   activate the voice remote control upon receiving a trigger command.

20. A non-transitory computer readable medium having instructions operable to cause one or more processors to perform operations comprising:
   detecting, on a customer-premise equipment, voice data from a space;

calculating, on the customer-premise equipment, an estimated voice source location from the detected voice data;

detecting, on the customer-premise equipment, wireless location data from a positioning system within the space, the positioning system being a separate device from the customer-premise equipment;

calculating, on the customer-premise equipment, a probability of a user within one or more regions from the calculated estimated voice source location and the detected wireless location data, the one or more regions being regions of a plurality of regions within the space;

steering, from the customer-premise equipment, a microphone array for voice detection toward the one or more regions having the probability of the user within the one or more regions; and receiving, on the electronic device, a voice command from the user located in the one or more regions having the probability of the user within the one or more regions, the voice command being an activity trigger for the electronic device.

21. The non-transitory computer readable medium according to claim 20, further comprising:

processing, on the customer-premise equipment, current voice source location data from the detected voice data;

calculating, on the customer-premise equipment, a current probability estimate for each of the plurality of regions within the space from the current voice source location data from the detected voice data;

processing, on the customer-premise equipment, current wireless position data from the detected wireless location data;

calculating, on the customer-premise equipment, a current probability estimate for each of the plurality of regions within the space from the current wireless position data from the detected wireless location data; and storing, on the customer-premise equipment, the current probability estimates for each of the plurality of regions from the current voice source location data and the current wireless position data.

22. The non-transitory computer readable medium according to claim 21, further comprising:

calculating, on the customer-premise equipment, a weighted probability for each of the plurality of regions from the current voice source location data; and calculating, on the customer-premise equipment, a weighted probability for each of the plurality of regions from the current wireless position data;

calculating, on the customer-premise equipment, a combined weighted probability for each of the plurality of regions using the calculated weighted probability form each of the regions from the current voice source location data and the calculated weighted probability for each of the regions from the current wireless position data;

discarding, on the customer-premise equipment, one or more of the plurality of regions having the combined weighted probability below a given threshold value for post processing; and/or using, on the customer-premise equipment, any of the plurality of regions having the combined weighted probability equal to or greater than the threshold value for calculating a final probability of the user being within the one or more regions of the plurality of regions within the space for detecting of a trigger command.

* * * * *